(12) United States Patent
Williams et al.

(10) Patent No.: US 8,621,517 B2
(45) Date of Patent: *Dec. 31, 2013

(54) METHOD AND APPARATUS FOR CHANNEL SURFING THROUGH MULTIPLE SOURCES BASED ON USER-DEFINABLE PREFERENCES

(75) Inventors: Christopher D. Williams, Soquel, CA (US); Jean M. Goldschmidt Iki, San Jose, CA (US); Anthony A. Shah-Nazaroff, Santa Clara, CA (US); Kenneth Alan Moore, Ben Lomond, CA (US); David N. Hackson, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 2783 days.

This patent is subject to a terminal disclaimer.

(21) Appl. No.: 10/627,085

(22) Filed: Jul. 24, 2003

(65) Prior Publication Data

US 2004/0019908 A1    Jan. 29, 2004

Related U.S. Application Data

(63) Continuation of application No. 09/183,732, filed on Oct. 30, 1998, now Pat. No. 7,313,806.

(51) Int. Cl.
*G06F 3/00* (2006.01)
*G06F 13/00* (2006.01)
*H04N 5/445* (2011.01)

(52) U.S. Cl.
USPC .............................................. 725/46; 725/49

(58) Field of Classification Search
USPC ..................................................... 725/46, 49
See application file for complete search history.

(56) References Cited

U.S. PATENT DOCUMENTS

| | | | |
|---|---|---|---|
| 4,706,121 A | 11/1987 | Young | |
| 4,977,455 A | 12/1990 | Young | |
| 5,481,294 A | 1/1996 | Thomas et al. | |
| 5,528,304 A | 6/1996 | Cherrick et al. | |
| 5,534,911 A | 7/1996 | Levitan | |
| 5,550,575 A | 8/1996 | West et al. | |
| 5,550,576 A | 8/1996 | Klosterman | |
| 5,564,088 A | 10/1996 | Saitoh | |
| 5,572,643 A | 11/1996 | Judson | |
| 5,583,560 A | 12/1996 | Florin et al. | |
| 5,585,865 A | 12/1996 | Amano et al. | |
| 5,585,866 A | 12/1996 | Miller et al. | |

(Continued)

FOREIGN PATENT DOCUMENTS

| | | |
|---|---|---|
| WO | 92/09087 | 5/1993 |
| WO | WO 94/14284 | 6/1994 |
| WO | WO-9414284 | 6/1994 |

OTHER PUBLICATIONS

PCT International Search Report, PCT/US99/25429, dated Oct. 28, 1999.

*Primary Examiner* — John Schnurr
(74) *Attorney, Agent, or Firm* — Blakely, Sokoloff, Taylor & Zafman LLP

(57) ABSTRACT

A method and apparatus for channel surfing through multiple sources based on user-definable preferences includes accessing a user-definable preferences list that identifies a plurality of channels from a plurality of different sources. One of the plurality of identified channels is selected for provision to a user.

33 Claims, 7 Drawing Sheets

(56) References Cited

U.S. PATENT DOCUMENTS

| | | |
|---|---|---|
| 5,589,892 A | 12/1996 | Knee et al. |
| 5,594,509 A | 1/1997 | Florin et al. |
| 5,596,373 A | 1/1997 | White et al. |
| 5,600,364 A | 2/1997 | Hendricks et al. |
| 5,694,176 A | 12/1997 | Bruette et al. |
| 5,699,125 A | 12/1997 | Rzeszewski et al. |
| 5,758,257 A | 5/1998 | Herz et al. |
| 5,758,259 A | 5/1998 | Lawler |
| 5,781,246 A | 7/1998 | Alten et al. |
| 5,784,095 A | 7/1998 | Robbins et al. |
| 5,798,785 A | 8/1998 | Hendricks et al. |
| 5,812,123 A | 9/1998 | Rowe et al. |
| 5,878,222 A | 3/1999 | Harrison |
| 5,929,932 A | 7/1999 | Otsuki et al. |
| 5,986,650 A | 11/1999 | Ellis et al. |
| 6,003,041 A | 12/1999 | Wugofski |
| 6,018,372 A | 1/2000 | Etheredge |
| 6,088,722 A | 7/2000 | Herz et al. |
| 6,133,910 A * | 10/2000 | Stinebruner ............... 725/49 |
| 7,185,355 B1 * | 2/2007 | Ellis et al. ................. 725/46 |

* cited by examiner

| CHANNEL IDENTIFIER | TUNING COMPONENT | SOURCE DESCRIPTION | |
|---|---|---|---|
| 32 | CABLE BOX | COUNTRY/WESTERN MUSIC CHANNEL | |
| 210 | SATELLITE DISH | COUNTRY/WESTERN MUSIC CHANNEL | |
| DISK(1) | CD PLAYER | GARTH BROOKS GREATEST HITS | |
| 102.9 | STERO TUNER | WXYZ RADIO STATION | |
| . . . | | | |

502 — CHANNEL IDENTIFIER
504 — TUNING COMPONENT
506 — SOURCE DESCRIPTION
500 — (table)

FIG. 5

METHOD AND APPARATUS FOR CHANNEL SURFING THROUGH MULTIPLE SOURCES BASED ON USER-DEFINABLE PREFERENCES

CROSS REFERENCE TO RELATED APPLICATIONS

This application is a continuation application of currently pending U.S. application Ser. No. 09/183,732, filed on Oct. 30, 1998 now U.S. Pat. No. 7,313,806.

BACKGROUND OF THE INVENTION

1. Field of the Invention

The present invention pertains to the filed of entertainment systems. More particularly, this invention relates to allowing users to channel surf through multiple sources based on user-definable preferences.

2. Background

A recent trend in electronics and computer industry is the convergence of computer systems and more traditional entertainment system components. Such convergence allows an increasingly broad range of information to be made available for system users over and above the broadcast television programming which has long been provided via conventional televisions. Accompanying this convergence is the expansion of television programming transport media (e.g., the mechanism or "pipe" via which the programming is transported to the television). While analog broadcasts and analog cable were once the standard transport media for television programming, digital cable and digital satellite systems are becoming more and more commonplace. Additionally, other transport media, such as digital broadcasts, are starting to appear as options for viewers.

Using different transport media has increased the number of sources from which television programming can be received, and thus has also increased the number of television programs available for viewing. These increases are due to both the increase in number of transport media, as well as the additional bandwidth capabilities of some of the newer types of transport media. Additionally, other "local" sources (e.g., video cassette recorders) can also supply programming, thereby further increasing the programming options available to users. Furthermore, this convergence of computer systems and more traditional entertainment system components can result in different types of programming becoming available to users. For example, analog radio broadcasts or digital cable music broadcasts can be made available to the user through such convergence systems.

However, one problem presented with convergence systems is the ease in which a user can choose from the large number of programming choices available. While a user may have had a choice of a dozen local broadcast channels or 30-40 cable channels a few years ago, the additional transport media currently being used has increased programming options into the hundreds, and will commonly be in the thousands in the not-too-distant future. The time required for the user to "surf" through all such channels from a variety of different sources becomes burdensome, thereby reducing the user's enjoyment of the system. Furthermore, in many situations a user will simply be interested in watching and/or listening to the programming, and not be particularly interested in what the source (e.g., analog broadcast or analog cable) is.

Therefore, a need exists for an improved way for a user to surf through channels from a variety of different sources.

SUMMARY OF THE INVENTION

A method and apparatus for channel surfing through multiple sources based on user-definable preferences is described herein. According to one aspect of the present invention, a computerized method includes accessing a user-definable preferences list that identifies a plurality of channels from a plurality of different sources, and selecting one of the plurality of identified channels for provision to a user.

According to one aspect of the present invention, an article includes a storage medium, the storage medium having stored thereon a plurality of instructions that, when executed by a processor, result in accessing a user-definable preferences list that identifies a plurality of channels from a plurality of different sources, and selecting one of the plurality of channels for provision to a user.

According to one aspect of the present invention, an apparatus includes a storage device to store a user-definable preferences list that identifies a plurality of channels from a plurality of different sources, and a channel selection controller, coupled to the storage device, to access the user-definable preferences list and select one of the plurality of channels for provision to a user.

BRIEF DESCRIPTION OF THE DRAWINGS

The present invention is illustrated by way of example and not limitation in the figures of the accompanying drawings, in which like references indicate similar elements and in which:

FIG. 5 illustrates an example electronic programming guide database according to one embodiment of the present invention;

DETAILED DESCRIPTION

In the following detailed description numerous specific details are set forth in order to provide a thorough understanding of the present invention. However, it will be understood by those skilled in the art that the present invention may be practiced without these specific details. In other instances well known methods, procedures, components, and circuits have not been described in detail so as not to obscure the present invention.

Parts of the description will be presented in terms of operations performed by a computer system, using terms such as data, flags, bits, values, characters, strings, numbers and the like, consistent with the manner commonly employed by those skilled in the art to convey the substance of their work to others skilled in the art. As is well understood by those skilled in the art, these quantities take the form of electrical, magnetic, or optical signals capable of being stored, transferred, combined, and otherwise manipulated through mechanical and electrical components of the computer system; and the term computer system includes general purpose as well as special purpose data processing machines, systems, and the like, that are standalone, adjunct or embedded.

Additionally, various operations will be described as multiple discrete steps in turn in a manner that is helpful in understanding the present invention. However, the order of description should not be construed as to imply that these operations are necessarily order dependent, in particular, the order of their presentations.

The present invention provides a method and apparatus for channel surfing through multiple sources based on user-definable preferences. One or more user-definable preferences lists that identify multiple different channels from a variety of different sources are maintained by the present invention. A user is able to surf through the channels in a preferences list rather than being required to surf through the entire range of channels, and furthermore can do so without concern for which source a particular channel corresponds to.

As used herein, a "channel" refers to a particular communication path from a source (e.g., particular frequencies transmitted by analog television broadcast and cable sources or radio stations) or origination location of a source (e.g., location identifiers (such as uniform resource locators (URLs)) of network servers). Many sources will include multiple channels.

Figure 1:
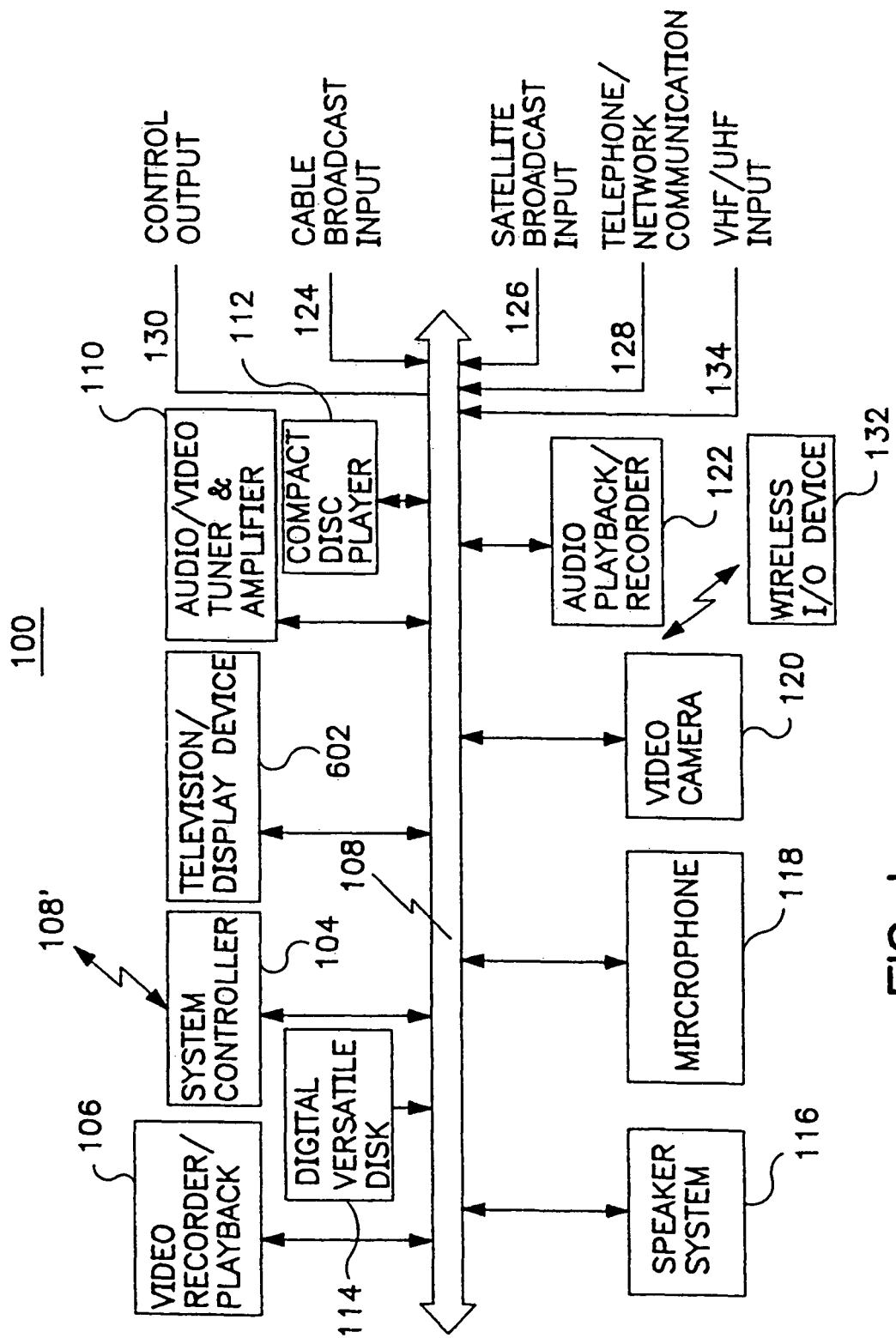
FIG. 1 is a block diagram illustrating the system components of an exemplary entertainment system in which one embodiment of the present invention may be practiced.

FIG. 1 is a block diagram illustrating the system components of an exemplary entertainment system in which one embodiment of the present invention may be practiced. System 100 operates to provide (e.g., display, play, etc.) audio and/or video programming to a user(s). System 100 includes television/display device 102, video recorder/playback device 106, digital video disk (DVD, also referred to as digital versatile disk) recorder/playback device 114, audio/video tuner and/or amplifier 110, audio playback/recorder device 122, and compact disc (CD) player 112, all coupled to a common input/output (I/O) bus 108. It is to be appreciated that the use of the common I/O bus 108 is for ease of explanation in the diagram only, and that a number of alternative means of routing input and output signals may be beneficially employed. For example, audio input and output could be routed with an appropriate number of independent audio "patch" cables, video signals may be routed with independent coaxial cables, and control signals may be routed along a two-wire serial line, or through infrared (IR) communication signals or radio frequency (RF) communication signals. By way of further example, audio, video, and/or control signals may also be routed along one or more buses in accordance with the Universal Serial Bus Specification, Revision 1.0 (Jan. 15, 1996), or the High Performance Serial Bus IEEE Standard 1394, IEEE std. 1394-1995, draft 8.0v3, approved Dec. 12, 1995.

In addition, system 100 includes speaker system 116, microphone 118, video camera 120 and a wireless input/output control device 132. In one embodiment, wireless I/O control device 132 is an entertainment system remote control unit which communicates with the components of system 100 through IR signals. In another embodiment, wireless I/O control device 132 may be a wireless keyboard and/or cursor control device that communicates with the components of system 100 through IR signals or RF signals. In yet another embodiment, wireless I/O control device 132 may be an IR or RF remote control device similar in appearance to a typical entertainment system remote control with the added feature of a track-ball or other cursor control mechanism that allows a user to position a cursor on a display of system 100.

At the core of system 100 is system controller 104 incorporated with the features of the present invention, configured to control a variety of features associated with the system components. As depicted, system controller 104 is coupled to each of the system components, as necessary, through I/O bus 108. In one embodiment, in addition to or in place of I/O bus 108, system controller 104 may be configured with a wireless communications transmitter (or transceiver), which is capable of communicating with the system components via IR signals or RF signals 108'. Regardless of the control medium, system controller 104 is configured to control each of the entertainment system components of system 100, although it is understood that each of the components may be individually controlled with wireless I/O device 132.

System controller 104 retrieves and stores entertainment programming information available from a wide variety of sources. During operation of system 100, system controller 104 dynamically configures the operating parameters of system 100 and offers additional value added features to enhance the user's enjoyment of system 100, as discussed in more detail below. In one embodiment, system controller 104 may be a computer system incorporated with the teachings of the present invention, as will be discussed in further detail below. In another embodiment, system controller 104 may be a "set-top" box endowed with the necessary processing power and incorporated with the teachings of the present invention. Regardless of the particular embodiment, system controller 104 may also be referred to as a "convergence system" designed to integrate the world of entertainment systems and computing platforms to achieve the beneficial results discussed in greater detail below.

Although the present invention is described in the context of the exemplary embodiments presented in the figures, based on the descriptions to follow, those skilled in the art will appreciate that the present invention is not limited to these embodiments and may be practiced in a variety of alternate embodiments. Accordingly, the innovative features of the present invention may be practiced in a system of greater or lesser complexity than that of the system depicted in FIG. 1. By way of example, devices may be added to system 100, or devices (e.g., video camera 120, microphone 118, DVD recorder/playback device 114, etc.) may be removed from system 100.

As illustrated in FIG. 1, system 100 can be configured to receive audio/video programming input via a wide variety of transport media. In one embodiment, system 100 receives programming input via any or all of the following transport media: cable broadcast 124, satellite broadcast 126 (e.g., via a satellite dish), very high frequency (VHF) or ultra high frequency (UHF) radio frequency communication of the broadcast networks 134 (e.g., via an aerial antenna), and/or the telephone/computer network interface 128. Further, it will be appreciated by those skilled in the art that cable broadcast input 124, satellite broadcast input 126 and VHF/UHF input 134 may include analog and/or digital programming (e.g., digital high definition television (HDTV) programming). Additionally, audio/video programming may be received from a CD-ROM, DVD, or other digital or analog storage device via a playback device of system 100 (e.g., DVD recorder/playback device 114). The Internet, an entertainment network, or other network may also provide audio/video programming, via, for example, interface 128.

In addition to programming input, system 100 is also configured with a number of general purpose control outputs 130 which may be configured to control any number of devices. In one embodiment, for example, as system controller 104 configures system 100 to display a movie, it may also dim the lights in the room to a predetermined level to further enhance the viewing environment. Control circuitry which allows a computing device to control, for example, lighting, thermostat settings, and other household appliances (via, for example, the electrical wiring in a house) are well known in the art and thus will not be described further.

Except for the incorporated teachings of the present invention (to be more fully described below), system controller 104 is intended to represent a broad category of computing devices known in the art. An example of such a computing device is a desktop computer system equipped with a high performance microprocessor(s), such as the Pentium® processor, Pentium® Pro processor, or Pentium® II processor manufactured by and commonly available from Intel Corporation of Santa Clara, Calif. Another example of such a computing device is an Internet "appliance" device, such as a WebTV™ Internet Terminal available from Sony Electronics Inc. of Park Ridge, N.J., or Philips Consumer Electronics Company of Knoxville, Tenn. It is to be appreciated that the housing size and design for system controller 104 may be altered, allowing it to better visually fit into system 100.

It is also to be appreciated that the several entertainment system components depicted in FIG. 1 can be beneficially combined. By way of example, system controller 104 could be integrated into television/display device 102, DVD recorder/playback device 114, or audio/video tuner and amplifier 110.

Figure 2:
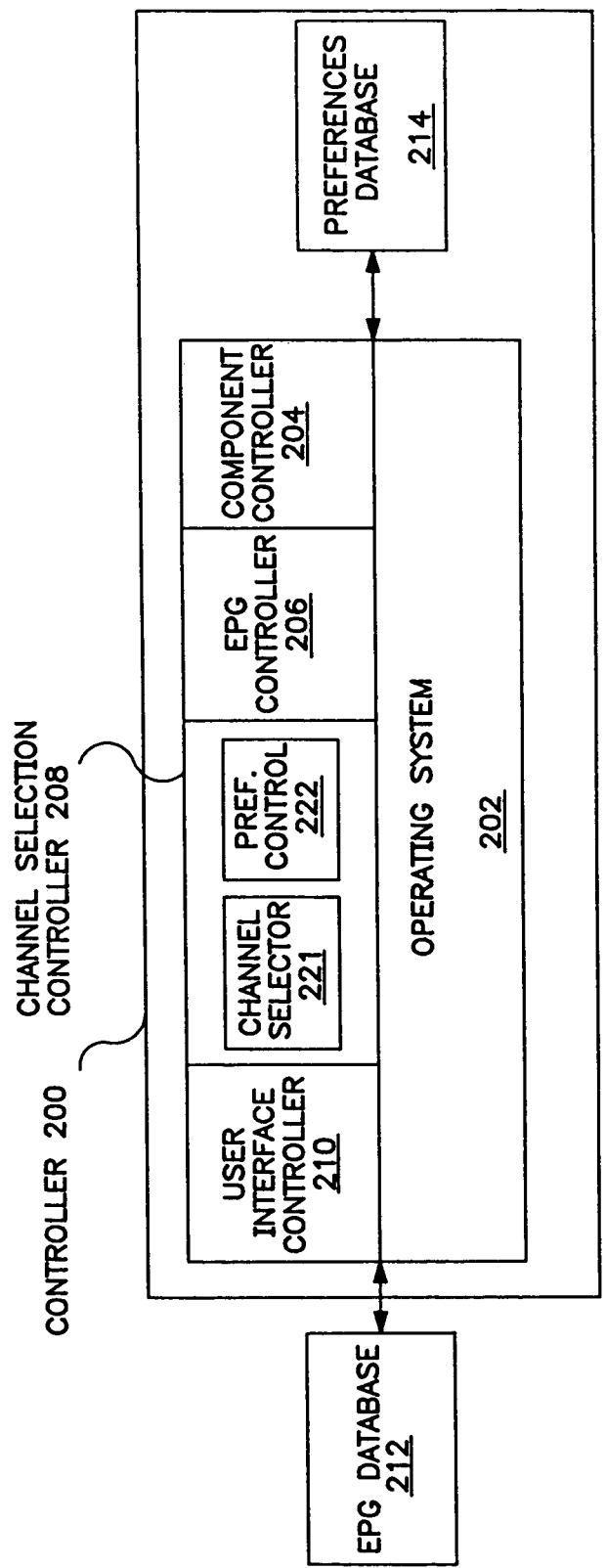
FIG. 2 is a block diagram illustrating the architecture of a system controller according to one embodiment of the present invention.

FIG. 2 is a block diagram illustrating the architecture of a system controller according to one embodiment of the present invention. According to one implementation, system controller 104 of FIG. 1 is a system controller 200 of FIG. 2. As illustrated, system controller 200 includes operating system 202, component controller 204, electronic programming guide (EPG) controller 206, channel selection controller 208, and user interface (UI) controller 210. Operating system 202 represents any of a wide variety of conventional operating systems (such as the Windows™ 95 or Windows™ 98 operating systems available from Microsoft Corporation of Redmond, Wash.), and operates to allow the controllers 204-210 to communicate with one another. Additionally, communication with other components within an entertainment system can also be provided by operating system 202, such as with the components illustrated in FIG. 1.

Component controller 204 controls the various components within the entertainment system, such as those illustrated in FIG. 1. Commands to change the various parameters of the components, such as channel selection or volume control, are sent to those components from component controller 204.

EPG controller 206 controls access to electronic programming guide (EPG) database 212. EPG database 212 is typically stored on a storage device within the entertainment system (such as a magnetic or optical disk), with selected portions being temporarily stored in system memory (such as random access memory). EPG controller 206 accesses database 212 and displays requested EPG data on a display device (e.g., device 102 of FIG. 1). EPG controller 206 services requests for information from the EPG database from other components of controller 200, such as UI controller 210 and channel selection controller 208.

Channel selection controller 208 controls the surfing through a user-definable preferences list(s) of the present invention. Channel selection controller 208 includes channel selector 221 and preferences control 222. Preferences control 222 interacts with preferences database 214 to allow a user to access and modify the stored preferences. When a user requests to be provided with a new channel, channel selector 221 accesses preferences database 214 and determines the next channel to be provided to the user. Preferences database 214 identifies channels available to the entertainment system from multiple different sources. Channel selector 221 also communicates with component controller 204 to communicate with the appropriate entertainment system component(s) as necessary to provide the new channel. The selection of the next channel in accordance with the present invention is discussed in more detail below.

According to one embodiment of the present invention, preferences database 214 includes different preferences lists for different users of the system. Thus, in this embodiment, the system needs to know the particular user (or alternatively may simply default to non-user specific preferences lists). Identification of a particular user can be made in any of a variety of conventional manners, such as by a user id log-in process, voice recognition, etc. Alternatively, separate user preferences may not be maintained by the system. In this alternate embodiment a global user preferences list(s) is used for all system users.

It should be noted that, as illustrated in FIG. 2, the preferences information is independent of the EPG data. Thus, any changes that are made to the preferences information (e.g., channel additions or deletions) does not alter the EPG data which is available to the user. Thus, the channel preferences list(s) that can be surfed in accordance with the present invention do not alter the programming/channel data available for presentation from the EPG data.

The preferences lists stored within preferences database 214 can be received from a variety of sources. The preferences lists may be generated solely by the system user(s), the system can be pre-configured with default lists that can be subsequently updated by a user, default lists for particular areas (e.g., based on city or zip code) can be obtained from an external source (such as via a network (e.g., the Internet) or a CD ROM), etc.

Figure 3:
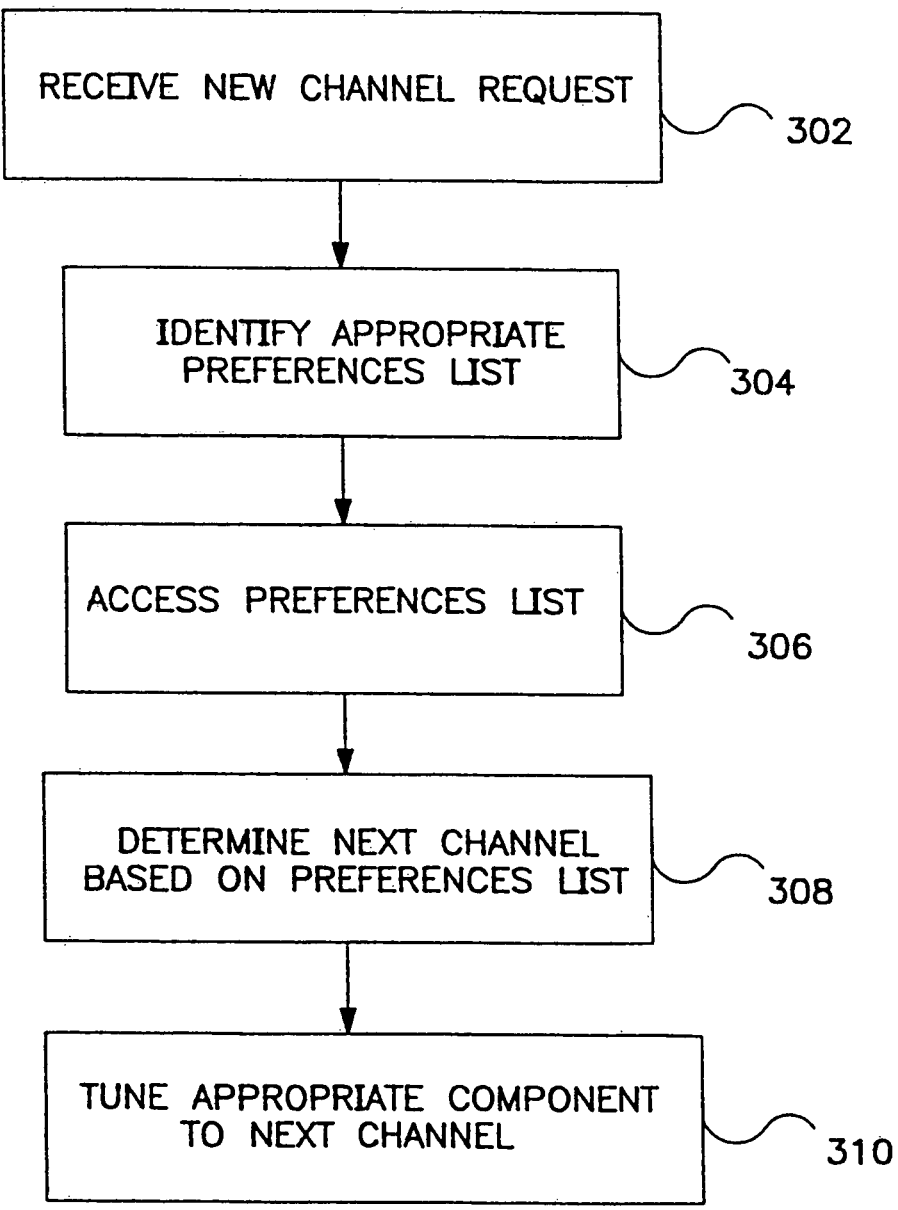
FIG. 3 is a flowchart illustrating the steps followed in allowing a user to channel surf through multiple sources according to one embodiment of the present invention.

FIG. 3 is a flowchart illustrating the steps followed in allowing a user to channel surf through multiple sources according to one embodiment of the present invention. Initially, channel selection controller 208 of FIG. 2 receives a new channel request, step 302. This new channel request is input in any of a variety of conventional manners, such as by user selection of a "channel up" arrow or "channel down" arrow on a remote control device. Channel selector 221 then identifies an appropriate preferences list, step 304. Alternatively, if multiple preferences lists are not supported, then step 304 can be skipped.

Figure 4:
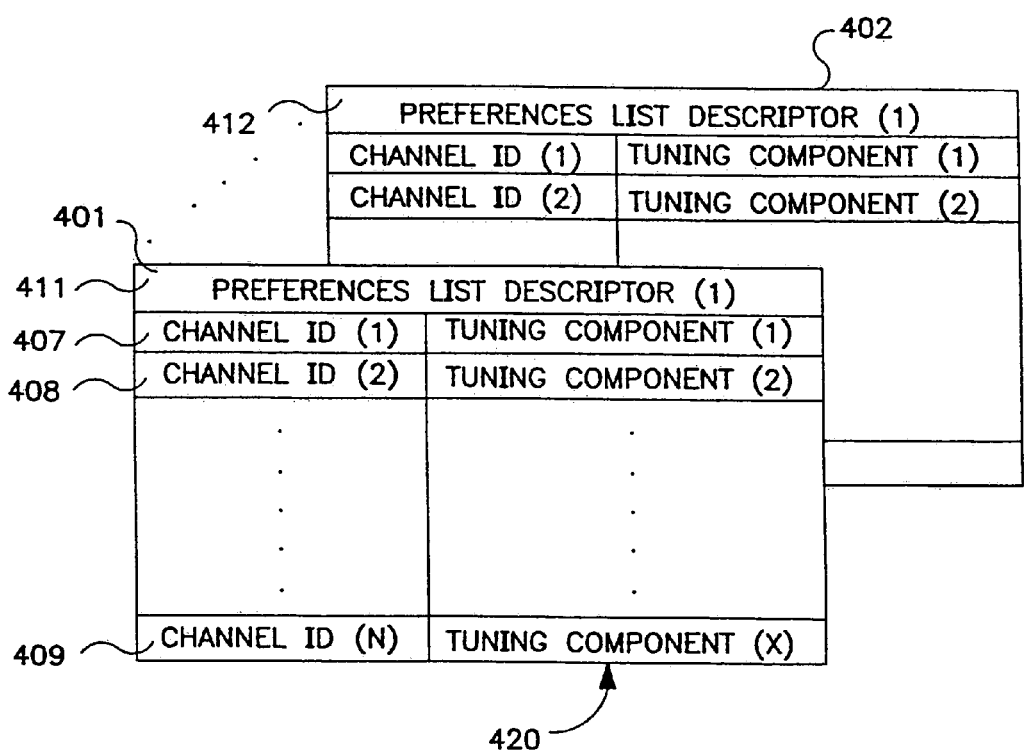
FIG. 4 illustrates preferences lists according to one embodiment of the present invention.

FIG. 4 illustrates preferences lists according to one embodiment of the present invention. Multiple (m) preferences lists 401 and 402 are illustrated. Each preferences list 401 and 402 can include multiple channel identifiers, such as channel identifiers 407, 408, and 409 of preferences list 401. Each of the channel identifiers corresponds to any one of multiple different sources (e.g., analog television broadcast, network server, radio broadcast, etc.). Additionally, multiple channels can correspond to the same source. The channel identifiers can be arranged in the preferences lists in any of a variety of manners, such as by source, by some user-defined order, by the order in which the identifiers were added to the list, arbitrarily, etc.

Each of the multiple preferences lists 401-402 can correspond to different users and/or categories. In the illustrated embodiment, the lists 401-402 are identified by their descriptors 411-412. Examples of such descriptors include, "User Joe Smith", "Sports", or "User Jane Smith; Country/Western". If at least one of preferences lists 401-402 corresponds to a particular user, then the appropriate preferences list is identified (step 304 of FIG. 3) by searching the lists 401-402 for the current user of the entertainment system. This search may result in a single list, or alternatively may result in multiple lists (e.g., multiple category lists for that user, or at least one "generic" list in addition to possibly a category list for that user). If at least one of preferences lists 401-402 corresponds to a particular category, then the appropriate preferences list is also identified by searching the lists 401-402 for the category identified by the user. A specific category can be identified in a variety of manners, such as input to the system via a user interface (e.g., such as provided by UI interface 210 of FIG. 2), or entry of a particular category from a remote control device (e.g., selection of a particular category button, selection of channel selection keys corresponding to a particular category, entry of a category name via an alphanumeric input, etc.).

According to one embodiment of the present invention, user-specific preferences lists as well as "generic" preferences lists (those that correspond to multiple users, such as all users) can be included in preferences lists 401-402. Thus, it is possible that multiple preferences lists may correspond to a single user request. For example, preferences lists 401-402 may include a "sports" category for user Joe Smith, as well as a generic "sports" category for all users. In this situation, if user Joe Smith requests the new channel, then channel selector 221 selects one of these two preferences lists. This selection can be done in different manners for different implementations, such as by selecting the one that includes the user identification, randomly selecting one, selecting the one with greater (or fewer) entries, giving the user a choice of which he or she prefers, etc. Alternatively, both lists could be used (e.g., one after the other), etc.

Returning to FIG. 3, once the appropriate preferences list is identified in step 304, channel selector 221 of FIG. 2 accesses the identified preferences list, step 306. Based on the information within the accessed preferences list, channel selector 221 determines the next channel, step 308. The next channel can be identified in any of a range of manners. According to one implementation, channel selection controller 208 of FIG. 2 maintains a record of the current channel being provided to the user by the entertainment system (e.g., controller 200 may monitor and keep track of any channel changes in the system). In this implementation, channel selector 221 compares the current channel being provided to the accessed preferences list. If the current channel being provided is in the accessed preferences list, then the channel in the preferences list subsequent to the current channel being provided is determined to be the next channel. The determination of which channel is subsequent can "wrap" around from the last to the first channels (e.g., channel identifier 409 of FIG. 4 to channel identifier 407). If the current channel is not in the accessed preferences list, then the first channel in the preferences lists is determined to be the next channel. Alternatively, the next channel may simply be the channel in the preferences list subsequent to the previously identified channel in step 308, regardless of how long ago and how many intervening channels have been selected.

Once the next channel is determined in step 308, the appropriate component is "tuned" to that determined channel, step 310. This "tuning" process is accomplished by channel selection controller 208 sending a message to component controller 204 indicating the appropriate device within the entertainment system that is the source for the determined channel, as well as an identifier of the determined channel itself. Component controller 204 then sends the appropriate signal(s) to the appropriate component(s) of the entertainment system to tune to and provide the determined channel.

The appropriate component for tuning to the determined channel can be identified in different manners. According to one embodiment of the present invention, preferences lists 401-402 of FIG. 4 include additional "tuning component" information 420 that identifies which component within the entertainment system is used to tune to which channels.

According to an alternate embodiment of the present invention, the EPG database 212 of FIG. 2 is accessed to identify the appropriate component for tuning to the determined channel. An example EPG database is illustrated in FIG. 5. As illustrated, database 500 includes channel identifiers 502, tuning component identifiers 504, and source descriptors 506. Additional information (e.g., show times, show description information such as title and actors/actresses, etc.) is also included in database 500 (but is not shown). Channel selection controller 208 of FIG. 2 can access EPG database 500 and search the channel identifiers 502 for the determined channel (from step 308 of FIG. 3). Upon locating the determined channel within database 500, controller 208 can then identify the tuning component corresponding to that channel based on the corresponding tuning component identifier 504. It should be noted that multiple entries will most likely exist for each channel, corresponding to different times and shows. As all of these entries would have the same tuning component, any one of them could be used to identify the tuning component corresponding to that channel.

It should be noted that the channel surfing method of the present invention can be initiated in any of a variety of manners. According to one implementation, the channel surfing method is initiated by selection of a "channel up" or "channel down" button on a remote control device. Alternatively, the channel surfing method may be initiated by activation of a dedicated button or switch on a remote control device, selection of an on-screen option (e.g., a graphical button or menu option), by voice command (e.g., "next channel" or "channel up"), etc.

Figure 6:
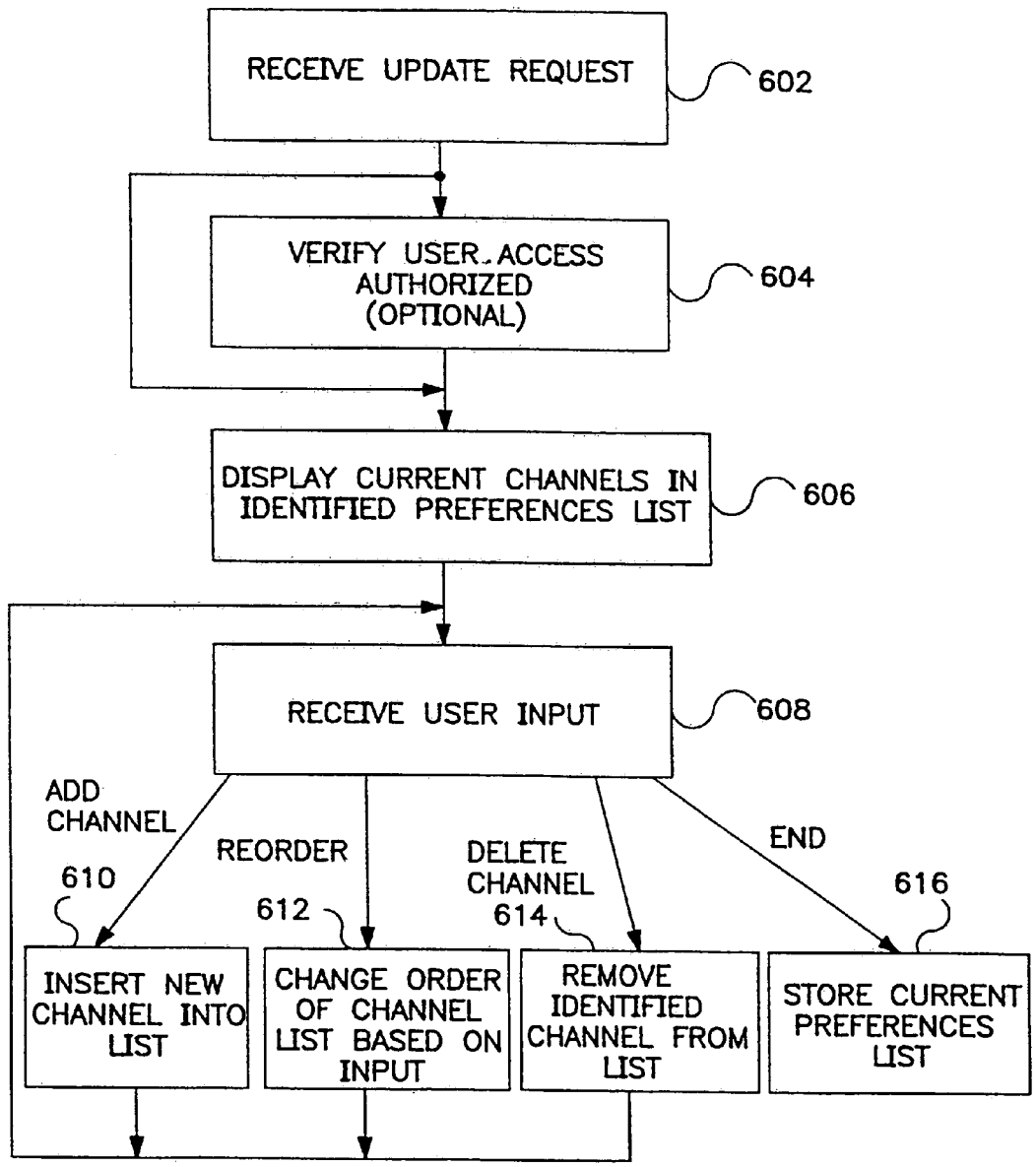
FIG. 6 is a flowchart illustrating the steps followed in allowing updating of the user preferences lists according to one embodiment of the present invention.

FIG. 6 is a flowchart illustrating the steps followed in allowing updating of the user preferences lists according to one embodiment of the present invention. An update request from a user is first received by channel selection controller 208 of FIG. 2, step 602. In the illustrated embodiment, this request also includes an indication of the particular preferences list that is to be updated. The user can identify a particular preferences list in a range of manners, such as inputting the user identification and/or category of the list to be updated, or selecting from a list display provided by controller 208. According to one implementation, controller 208 provides additional security (e.g., password protection) to prevent unauthorized access to the preferences list(s). In this implementation, controller 208 verifies the current user is authorized to access the lists, step 604. If the user is not authorized, then the process ends and no updating of the preference list(s) occurs. In an alternate implementation, no such checking is performed and processing flows from step 602 directly to step 606.

In step 606, preferences control 222 of FIG. 2 access preferences database 214 to retrieve the identified preferences list and displays the list to the user (e.g., on display device 102 of FIG. 1). Preferences control 222 then waits for a user input, step 608. In the illustrated embodiment, four user inputs are permitted: add channel, delete channel, reorder channel listings, and end. Inputs can be provided by a user in a variety of manners, such as by selection of buttons, menu options, or in a "drag and drop manner" via a graphical user interface provided by UI 210 of FIG. 2, alphanumeric command and data inputs, etc.

If the "add channel" input is received, then preferences control 222 inserts into the list the channel identified by the input, step 610. If the "delete channel" input is received, then preferences control 222 removes from the list the channel identified by the input, step 614. If the "reorder channel listings" input is received, then preferences control 222 changes the order of the channels in the list in accordance with the input received, step 612. If the "end" input is received, then preferences control 222 stores the list as modified in steps 610-614, step 616.

Figure 7:
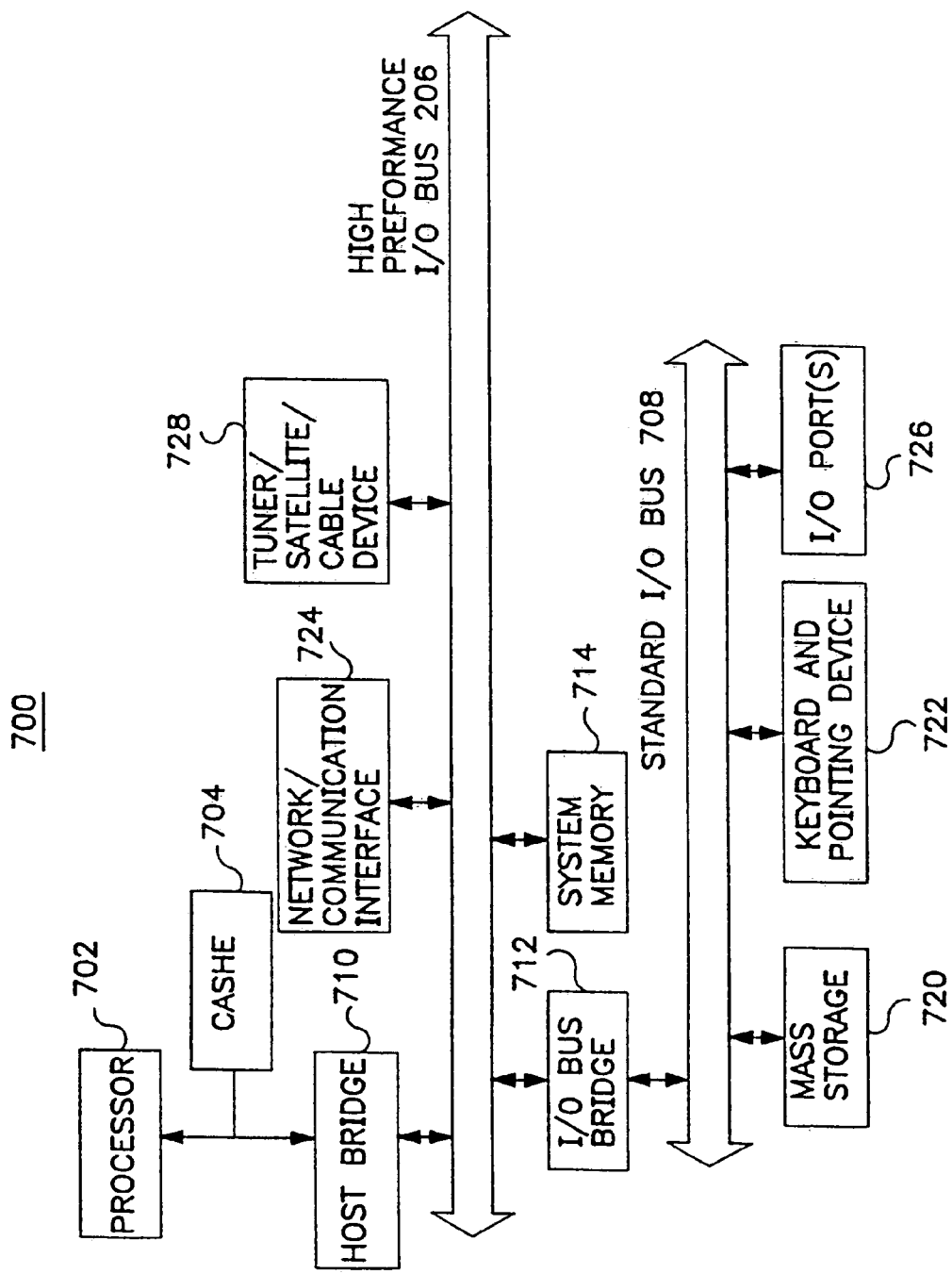
FIG. 7 illustrates one embodiment of a computing device suitable for use with the present invention.

FIG. 7 illustrates one embodiment of a computing device suitable for use with the present invention. According to one implementation, system controller 104 of FIG. 1 is a computing device 700 of FIG. 7. In the illustrated embodiment of FIG. 7, device 700 includes processor 702 and cache memory 704 coupled to each other as shown. Additionally, device 700 includes high performance input/output (I/O) bus 706 and standard I/O bus 708. Host bridge 710 couples processor 702 to high performance I/O bus 706, whereas I/O bus bridge 712 couples the two buses 706 and 708 to each other. Coupled to bus 706 are network/communication interface 724 and system memory 714. Coupled to bus 708 is mass storage 720, keyboard and pointing device 722, and I/O ports 726. Collectively, these elements are intended to represent a broad category of hardware systems, including but not limited to general purpose computer systems based on the Pentium® processor, Pentium® Pro processor, or Pentium® II processor, manufactured by Intel Corporation of Santa Clara, Calif.

In one embodiment, various electronic devices are also coupled to high performance I/O bus 706. As illustrated, analog tuner/digital satellite/cable devices 728, are also coupled to high performance I/O bus 706 to allow device 700 to "tune" to various programming input channels.

These elements 702-728 perform their conventional functions known in the art. In particular, network/communication interface 724 is used to provide communication between device 700 and any of a wide range of conventional networks, such as an Ethernet, token ring, the Internet, etc. It is to be appreciated that the circuitry of interface 724 is dependent on the type of network the device 700 is being coupled to.

Mass storage 720 is used to provide permanent storage for the data and programming instructions to implement the above described functions, whereas system memory 714 is used to provide temporary storage for the data and programming instructions when executed by processor 702. I/O ports 726 are one or more serial and/or parallel communication ports used to provide communication between additional peripheral devices which may be coupled to device 700.

It is to be appreciated that various components of device 700 may be re-arranged. For example, cache 704 may be on-chip with processor 702. Alternatively, cache 704 and processor 702 may be packaged together as a "processor module", with processor 702 being referred to as the "processor core". Furthermore, certain implementations of the present invention may not require nor include all of the above components. For example, mass storage 720, keyboard and pointing device 722, and/or network/communication interface 724 may not be included in device 700. Additionally, the peripheral devices shown coupled to standard I/O bus 708 may be coupled to high performance I/O bus 706; in addition, in some implementations only a single bus may exist with the components of device 700 being coupled to the single bus.

Furthermore, additional components may be included in device 700, such as additional processors, storage devices, or memories.

In one embodiment, the method and apparatus for channel surfing through multiple sources based on user-definable preferences according to the present invention as discussed above is implemented as a series of software routines run by device 700 of FIG. 7. In this embodiment, controllers 204-210 of FIG. 2 are each implemented as a series of software routines. These software routines comprise a plurality or series of instructions to be executed by a processor in a hardware system, such as processor 702 of FIG. 7. Initially, the series of instructions are stored on a storage device, such as mass storage 720. It is to be appreciated that the series of instructions can be stored using any conventional storage medium, such as a diskette, CD-ROM, magnetic tape, DVD, laser disk, ROM, Flash memory, etc. It is also to be appreciated that the series of instructions need not be stored locally, and could be received from a remote storage device, such as a server on a network, via network/communication interface 724. The instructions are copied from the storage device, such as mass storage 720, into memory 714 and then accessed and executed by processor 702. In one implementation, these software routines are written in the C++ programming language. It is to be appreciated, however, that these routines may be implemented in any of a wide variety of programming languages.

In alternate embodiments, the present invention is implemented in discrete hardware or firmware. For example, one or more application specific integrated circuits (ASICs) could be programmed with the above described functions of the present invention. By way of another example, controllers 204-210 of FIG. 2 could be implemented in one or more ASICs of an additional circuit board for insertion into hardware system 700 of FIG. 7.

In the discussions above, reference is made to particular "categories" of lists. It should be noted that any of a wide variety of categories can be used with the present invention, such as sports, country/western, classical, opera, movies, cartoons, etc. Additionally, personalized "favorites" categories can also be used, allowing the user to input particular channels that he or she prefers for whatever reasons.

Also in the discussion above, reference is made to identifying a "subsequent" channel in a preference list. It is to be appreciated that such subsequent channels can be identified in any of a wide range of manners, such as cycling through the list (either top to bottom or bottom to top) by a predetermined amount (e.g., one at a time), randomly selecting a channel, selecting according to some other pre-defined or dynamic ordering, etc. Additionally, selection could be based on source (e.g., radio stations first, then satellite, then cable, then television broadcast, etc.). Additionally, according to one alternate embodiment a "timeout" feature is included. The timeout feature causes the channel selector to return to its starting point in the preferences list (e.g., the first channel in the list) whenever a predetermined period of time (e.g., five minutes) passes without a channel selection from a user.

Additionally, in the illustrated embodiment the user is able to continuously cycle through the preferences list by repeated activation of the channel selection option (e.g., channel up or channel down buttons on a remote control device). According to one implementation, the present invention provides a visual or audio indication to the user when the user has completed one cycle of the preferences list.

Furthermore, according to an alternate embodiment, channel selector 221 includes an "automatic scan" function. In this embodiment, upon initiation of the channel surfing method of the present invention, channel selector 221 determines a next channel as discussed above with reference to FIG. 3. However, channel selector 221 continues, at predetermined intervals (e.g., every five seconds) to select and tune to another new channel. Thus, in this embodiment channel selector 221 continues to select and tune to new channels automatically without requiring repeated user selection. This process continues until deactivated (e.g., by selection of the same channel selector that initiated the channel surfing, by completion of one cycle through the channels in the preferences list, etc.).

Therefore, the present invention provides for channel surfing through multiple sources based on user-definable preferences. One or more preferences lists can advantageously be maintained in accordance with the present invention and modified by individual users to their own liking. Each of the lists can include channel identifiers from multiple different sources, allowing the user to advantageously surf through channels from the different sources without concern for, and perhaps even knowledge of, those sources.

Thus, a method and apparatus for channel surfing through multiple sources based on user-definable preferences has been described. Whereas many alterations and modifications of the present invention will be comprehended by a person skilled in the art after having read the foregoing description, it is to be understood that the particular embodiments shown and described by way of illustration are in no way intended to be considered limiting. References to details of particular embodiments are not intended to limit the scope of the claims.

What is claimed is:

1. A method of choosing a preferences list comprising:
   receiving a user identification for a current user at an entertainment system;
   identifying multiple stored preferences lists corresponding to the current user by searching a set of preferences lists stored in a database of the entertainment system, at least some of the preferences lists of the set of stored preferences lists corresponding to specific users, each of the preferences lists containing multiple entertainment programming channel identifiers;
   providing a list display of the identified stored preferences lists corresponding to the current user on a display coupled to the entertainment system;
   selecting one of the identified stored preferences lists by receiving a user choice at the entertainment system of one of the multiple identified preferences lists of the list display; and
   accessing the chosen preferences list.

2. The method of claim 1, further comprising:
   receiving a category identification from the current user;
   wherein identifying comprises searching the set of stored preferences lists also for the identified category; and
   wherein selecting one of the identified preferences lists includes the identified preferences lists for the identified category.

3. The method of claim 1, wherein identifying comprises searching the set of stored preferences lists also for generic preferences lists not corresponding to a specific user, and wherein selecting one of the identified preferences lists includes the identified generic preferences lists.

4. The method of claim 1, wherein the stored preferences lists each correspond to at least one of a user and a category.

5. The method of claim 1, wherein the entertainment programming identifiers identify particular communication paths for entertainment programming from any one of a wide variety of different transport media.

6. The method of claim 1, further comprising:
   receiving a new channel request; and
   determining a channel from the chosen preferences list to provide in response to the new channel request.

7. The method of claim 6, further comprising tuning a component of an entertainment system to the determined channel once the next channel is determined by sending a message to a component controller indicating an appropriate device within the entertainment system that is a source for the determined channel, as well as an identifier of the determined channel.

8. The method of claim 7, wherein the chosen preferences list includes information that identifies a component within the entertainment system to tune to the determined channel.

9. The method of claim 6, further comprising accessing an electronic programming guide (EPG) database to identify a component for tuning to the determined channel.

10. The method of claim 1, further comprising:
    receiving an update request from a user; and
    updating the chosen preferences list in accordance with a received user input.

11. The method of claim 10, wherein the update request includes an indication of the particular preferences list that is to be updated.

12. The method of claim 11, wherein the indication of the particular preferences list comprises a user selection from a list display.

13. The method of claim 10, wherein if a reorder channel listings input is received, updating comprises changing the order of the channels in the list in accordance with the reorder channel listings input.

14. The method of claim 10, further comprising verifying that the identified user is authorized to access the lists and if the user is not authorized, then not updating the preferences list.

15. A machine-readable memory having stored thereon a series of instructions which, when executed by a processor, cause the processor to perform operations comprising:
    receiving a user identification for a current user;
    identifying multiple stored preferences lists corresponding to the current user by searching a set of stored preferences lists, at least some of the preferences lists of the set of stored preferences lists corresponding to specific users, each of the preferences lists containing multiple entertainment programming channel identifiers;
    providing a list display of the identified stored preferences lists corresponding to the current user;
    selecting one of the identified stored preferences lists by receiving a user choice of one of the multiple identified preferences lists of the list display; and
    accessing the chosen preferences list.

16. The memory of claim 15, wherein the series of instructions further comprise instructions which, when executed by the processor, cause the processor to perform further operations comprising:
    receiving a category identification from the current user;
    wherein the instructions for identifying comprise instructions for searching the set of stored preferences lists also for the identified category; and
    wherein the instructions for selecting one of the identified preferences lists includes the identified preferences lists for the identified category.

17. The memory of claim 15, wherein the instructions for identifying comprise instructions for searching the set of stored preferences lists also for generic preferences lists not corresponding to a specific user, and wherein the instructions for selecting one of the identified preferences lists includes the identified generic preferences lists.

18. The memory of claim 15, wherein the preferences lists each correspond to at least one of a user and a category.

19. The memory of claim 15, wherein the chosen preferences list includes information that identifies a component within an entertainment system to tune to the determined channel.

20. An apparatus comprising:
- a user interface to receive a user identification from the current user of the entertainment system;
- a preferences database to store a set of preferences lists, at least some of the preferences lists corresponding to specific users, and each of the preferences lists containing multiple entertainment programming channel identifiers; and
- a channel selector to identify multiple stored preferences lists corresponding to the current user by searching the set of stored preferences lists, to select one of the identified multiple preferences lists by giving the user a choice of one of the multiple identified preferences lists using a list display of the identified stored preferences lists, and to access the chosen preferences list upon receiving a user choice from the list display.

21. The apparatus of claim 20, wherein the user interface is further to receive a category identification, and wherein the channel selector is further to search the set of stored preferences lists for the identified category and to give the user a choice including a preferences list for the identified category.

22. The apparatus of claim 21, wherein the user interface further comprises a remote control device with at least one of a particular category button, channel selection keys corresponding to a particular category, and an alphanumeric input.

23. The apparatus of claim 20, wherein the channel selector is further to search the set of stored preferences lists also for generic preferences lists not corresponding to a specific user, and to give the user a choice including the generic preferences lists.

24. The apparatus of claim 20, wherein the user interface is further to receive a new channel request, and the channel selector is further to determine the next channel, based on the information within the accessed preferences list.

25. The apparatus of claim 24, further comprising a channel selection controller to maintain a record of the current channel being provided to the user; and wherein the channel selector is further to compare the current channel being provided to the chosen preferences list, and if the current channel being provided is in the chosen preferences list, then to determine that the channel in the preferences list subsequent to the current channel being provided is the next channel.

26. The apparatus of claim 24, further comprising a component controller and wherein the channel selection controller is further to send a message to the component controller indicating a device within an entertainment system that is a source for the determined channel, as well as an identifier of the determined channel.

27. The apparatus of claim 26, wherein the component controller is to send a signal to the indicated device of the entertainment system to tune to and provide the determined channel.

28. The apparatus of claim 20, wherein the preferences lists include information that identifies components within an entertainment system to tune to channels.

29. The apparatus of claim 24, further comprising an electronic programming guide (EPG) database to identify a component for tuning to the determined channel.

30. The apparatus of claim 20, wherein the user interface is further to receive an update request from the user, the apparatus further comprising a preferences control to retrieve the chosen preferences list, to display the chosen preferences list to the user and to update the chosen preferences list in accordance with a user input.

31. The apparatus of claim 30, wherein the channel selection controller is further to verify that the current user is authorized to access the chosen preferences list and to not update the chosen preferences list if the current user is not authorized.

32. An entertainment system controller comprising:
- a remote control, operable by a user;
- a user interface to receive a user identification from the remote control;
- a preferences database to store a set of stored preferences lists, at least some of the stored preferences lists corresponding to specific users, and each of the stored preferences lists containing multiple entertainment programming channel identifiers; and
- a channel selector to identify multiple stored preferences lists by searching the set of stored preferences lists for the current user of the entertainment system, to select one of the identified multiple stored preferences lists by giving the user a choice of one of the multiple identified preferences lists using a list display of the identified stored preferences lists, and to access the chosen preferences list upon receiving a user choice from the list display; and
- a component controller to send a signal to a device of the entertainment system to tune the device to a channel from the accessed preferences list.

33. The controller of claim 32, further comprising an electronic programming guide (EPG) database to identify the component for tuning to the channel.

* * * * *